Figure 1:
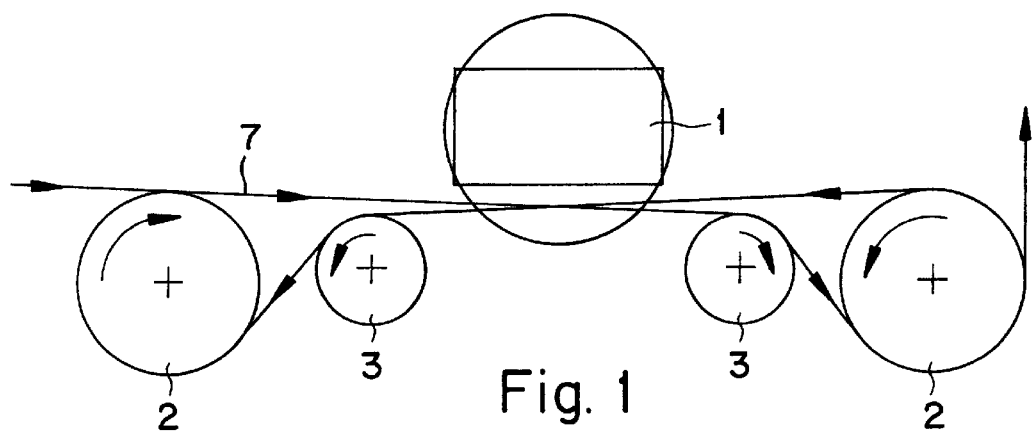

United States Patent [19]
Vojtechovsky

[11] Patent Number: 6,041,766
[45] Date of Patent: Mar. 28, 2000

[54] METHOD OF CUTTING BLOCKS OF HARD SUBSTANCES INTO PLATES BY MEANS OF A WIRE SAW, AND WIRE SAW FOR CARRYING OUT THIS METHOD

[75] Inventor: Karel Vojtechovsky, Radhoštěm, Czechoslovakia

[73] Assignee: Trimex Tesla, s.r.o., Czech Rep.

[21] Appl. No.: 09/125,826

[22] PCT Filed: Feb. 25, 1997

[86] PCT No.: PCT/IB97/00155

§ 371 Date: Nov. 2, 1998

§ 102(e) Date: Nov. 2, 1998

[87] PCT Pub. No.: WO97/32681

PCT Pub. Date: Sep. 12, 1997

[30] Foreign Application Priority Data

Mar. 6, 1996 [CS] Czechoslovakia ..................... 669-96

[51] Int. Cl.⁷ .................................................. B28D 1/06
[52] U.S. Cl. ................................. 125/16.02; 125/16.01; 125/21; 83/651.1
[58] Field of Search ........................ 185/16.02, 16.07, 185/12, 21.12; 83/651.1

[56] References Cited

U.S. PATENT DOCUMENTS

| | | |
|---|---|---|
| 2,831,476 | 4/1958 | Wilson et al. . |
| 2,911,875 | 11/1959 | Ostermann et al. . |
| 3,008,864 | 11/1961 | Macklem et al. . |
| 3,027,285 | 3/1962 | Eisner et al. . |
| 3,115,087 | 12/1963 | Ginaven . |
| 3,155,087 | 11/1964 | Dreyfus . |
| 3,359,848 | 12/1967 | Ostermann . |
| 3,630,114 | 12/1971 | Bunting, Jr. et al. . |
| 3,824,982 | 7/1974 | Bowman . |
| 3,831,576 | 8/1974 | Mech . |
| 3,841,297 | 10/1974 | Mech . |
| 3,889,699 | 6/1975 | Ranieri . |
| 3,942,508 | 3/1976 | Shimizu . |
| 3,957,028 | 5/1976 | Lesiourd et al. . |
| 3,976,045 | 8/1976 | Coggins, Jr. . |

(List continued on next page.)

FOREIGN PATENT DOCUMENTS

| | | |
|---|---|---|
| 0002265 | 6/1979 | European Pat. Off. . |
| 0313714 | 5/1989 | European Pat. Off. . |
| 0767035 | 4/1997 | European Pat. Off. . |
| 0786317 | 7/1997 | European Pat. Off. . |
| 0824055 | 2/1998 | European Pat. Off. . |
| 0832725 | 4/1998 | European Pat. Off. . |
| 548791 | 3/1932 | Germany . |
| 2819420 | 12/1978 | Germany . |
| 3812591 | 11/1988 | Germany . |
| 3804873 | 8/1989 | Germany . |
| 3924367 | 2/1990 | Germany . |
| 4310549 | 10/1993 | Germany . |
| 4239212 | 5/1994 | Germany . |
| 82112 | 4/1976 | Poland . |
| 164715 | 10/1994 | Poland . |
| 591328 | 2/1978 | U.S.S.R. . |
| 743888 | 6/1980 | U.S.S.R. . |

(List continued on next page.)

Primary Examiner—Robert A. Rose
Assistant Examiner—M. Nguyen
Attorney, Agent, or Firm—Burns, Doane, Swecker & Mathis, LLP

[57] ABSTRACT

The invention concerns a method of cutting blocks of hard materials into plates by the action of an abrasive, which is added in the loose state, and of a continuous, revolving, fixed carrier. As a result of being guided in peripheral grooves in coaxial rollers of a roller system, the carrier forms a chain through which the material to be cut is pressed. The carrier, which runs in the peripheral grooves in the rollers of a roller system comprising at least one pair of deflection rollers and at least one pair of guide rollers, is pressed into the material to be cut such that it is guided in opposite directions in respectively two adjacent cuts in the block.

6 Claims, 4 Drawing Sheets

U.S. PATENT DOCUMENTS

| | | |
|---|---|---|
| 4,016,856 | 4/1977 | McLaughlin . |
| 4,044,509 | 8/1977 | Bos et al. . |
| 4,092,971 | 6/1978 | Viscount . |
| 4,092,972 | 6/1978 | Schmid . |
| 4,105,012 | 8/1978 | Hini et al. . |
| 4,134,384 | 1/1979 | Schafft et al. . |
| 4,160,439 | 7/1979 | Piat . |
| 4,191,159 | 3/1980 | Collins . |
| 4,287,869 | 9/1981 | Schmid . |
| 4,384,564 | 5/1983 | Smith et al. . |
| 4,576,139 | 3/1986 | Cogswell . |
| 4,580,545 | 4/1986 | Dorsten . |
| 4,655,191 | 4/1987 | Wells et al. . |
| 4,674,474 | 6/1987 | Baril . |
| 4,694,715 | 9/1987 | Jongerius . |
| 4,735,188 | 4/1988 | Kubo . |
| 4,765,307 | 8/1988 | Kubo . |
| 4,766,875 | 8/1988 | Feigelson . |
| 4,776,316 | 10/1988 | Ashkenazi . |
| 4,787,363 | 11/1988 | Kubo . |
| 4,832,411 | 5/1989 | Johnston et al. . |
| 4,893,607 | 1/1990 | Kubo . |
| 4,907,564 | 3/1990 | Sowa et al. . |
| 4,967,725 | 11/1990 | Hinzen . |
| 5,052,366 | 10/1991 | Matsukura . |
| 5,060,628 | 10/1991 | Ishida . |
| 5,074,277 | 12/1991 | Milholen . |
| 5,099,820 | 3/1992 | Stricot . |
| 5,193,518 | 3/1993 | Moller et al. . |
| 5,269,285 | 12/1993 | Toyama et al. . |
| 5,377,568 | 1/1995 | Hauser . |
| 5,377,659 | 1/1995 | Tank et al. . |
| 5,383,443 | 1/1995 | Buyens . |
| 5,519,938 | 5/1996 | Kojima et al. . |
| 5,564,409 | 10/1996 | Bonzo et al. . |
| 5,575,189 | 11/1996 | Kiuchi et al. . |
| 5,605,141 | 2/1997 | Bilotta . |
| 5,609,148 | 3/1997 | Mitwalsky et al. . |
| 5,628,301 | 5/1997 | Katamachi . |
| 5,699,782 | 12/1997 | Toyama . |
| 5,711,287 | 1/1998 | Speer . |
| 5,715,806 | 2/1998 | Tonegawa et al. . |
| 5,715,807 | 2/1998 | Toyama et al. . |
| 5,771,876 | 6/1998 | Egglhuber .................. 125/16.02 |
| 5,794,607 | 8/1998 | Aihara et al. ............... 125/16.02 |
| 5,829,424 | 11/1998 | Hauser ....................... 125/16.02 |
| 5,865,162 | 2/1999 | Kambe et al. .............. 125/16.02 |

FOREIGN PATENT DOCUMENTS

| | | |
|---|---|---|
| 1230861 | 5/1986 | U.S.S.R. . |
| 1232485 | 5/1986 | U.S.S.R. . |
| 1662866 | 7/1991 | U.S.S.R. . |
| 2216441 | 10/1989 | United Kingdom . |
| 2221145 | 1/1990 | United Kingdom . |
| WO86/04295 | 7/1986 | WIPO . |
| WO88/08363 | 11/1988 | WIPO . |
| WO89/01395 | 2/1989 | WIPO . |
| WO93/14914 | 8/1993 | WIPO . |
| WO94/25733 | 11/1994 | WIPO . |

METHOD OF CUTTING BLOCKS OF HARD SUBSTANCES INTO PLATES BY MEANS OF A WIRE SAW, AND WIRE SAW FOR CARRYING OUT THIS METHOD

FIELD OF TECHNOLOGY

The invention relates to a method of cutting blocks of hard substances into plates, especially blocks consisting of semi-conductors, glass and ceramics, as well as a saw for carrying out this method.

PREVIOUS STATE OF THE ART

For cutting up blocks of hard substances, e.g. blocks made of semi-conductors, ceramics and glass, a method is usually used which uses the effect of an abrasive added in the loose state and a movable solid carrier, generally a continuous wire, on the substance to be cut. This method is characterised in that the abrasive, distributed in a liquid, for example in oil, is conveyed with the aid of a wire via a system of grooved rollers to the cutting point, the cut substance being gradually pressed by a chain of revolving wires. The thickness of the cut plates is determined by the distance between the grooves in the rollers, the thickness of the wire or the granularity of the abrasive, and the quality of the cut is determined by the abrasive material and the block substance as well as by additional technological parameters.

A series of methods and devices are known, e.g. according to patent documents U.S. Pat. No. 4,494,523, U.S. Pat. No. 4,574,769, U.S. Pat. No. 4,640,259, U.S. Pat. No. 4,903,682, U.S. Pat. No. 5,201,305, U.S. Pat. No. 5,269,285 or GB 2 216 441, which describe devices and protect various embodiments of same using the given principle. A common feature of the traditional solutions is that the wire is led in a system of grooved rollers in such a manner that, during the cutting process, it moves in all the cuts of the block in one direction at any given time. The result of this is that the plates produced do not have a constant thickness along the cut, i.e. that they taper in the direction of the movement of the wire as a result of the decreasing effect and amount of wire abrasive adhering to the wire as it passes through the cut in the block. The size of the taper can be partially corrected by moving the wire in both direction, by guiding the moving wire after a certain cutting time, with the aid of reverse switching the movement, in all the block cuts in an opposite direction. However, a disadvantage of this method consists in the fact that the cutting process is noticeably slowed down and the cutting does not proceed continuously since it involves great energy losses when the movement of the wire is stopped and started, the possibility of interference in the cyclically reversed and stressed nodal points of the device increasing.

ESSENCE OF THE INVENTION

The method defined in claim 1 overcomes the disadvantages listed above. Its essence consists in the fact that the continuous solid carrier, which runs in the peripheral grooves in the rollers of a roller system consisting of at least one pair of deflection rollers and one pair of guide rollers, is pressed into the material to be cut such that it is guided in opposite directions in respectively two adjacent cuts in the block. The continuous solid carrier in the chain of the roller system is here guided repeatedly in peripheral grooves from the upper side of the first deflection roller over the upper side of the guide roller lying opposite on to the lower side of the adjacent second deflection roller, after passing which it is guided over the upper side of the guide roller oriented in the opposite direction back to the lower side of the first deflection roller and then back to its upper side.

The saw for cutting tip blocks according to this method consists of a roller system which has rollers provided with peripheral grooves and which is attached to a frame, a table with mountings, a wire guide and an arrangement for transporting and heat-stabilising the abrasive. It is characterised in that the roller system is formed from at least one pair of guide rollers and at least one pair of deflection rollers, the deflection rollers being so mounted in relation to the guide rollers that the guide roller and deflection roller mounted beside one another rotate in opposite directions, the direction of rotation between the two guide rollers and the two deflection rollers being likewise opposed.

On an advantageous embodiment, the deflection rollers and the guide rollers are positioned in such a way that the upper surface line of the deflection rollers is disposed higher than the upper surface line of the guide rollers and the position of the guide rollers is axially adjustable in a fixed frame. The solid carrier is wound several times around the peripheral grooves of the roller arrangement in such a way that it forms a chain in which it is guided into the working space between the pair of guide rollers in opposite directions in respectively two adjacent peripheral grooves from the top sloping downwards or from the bottom sloping upwards.

In the cutting method proposed, greater efficiency is achieved in that, whilst maintaining the necessary speed and the continuous cutting process, i.e. without energy-consuming reverse switching of the direction of movement of the solid carrier, cut plates with even, parallel walls are obtained without the previous tapers.

DESCRIPTION OF THE DIAGRAMS IN THE DRAWINGS

Figure 2:
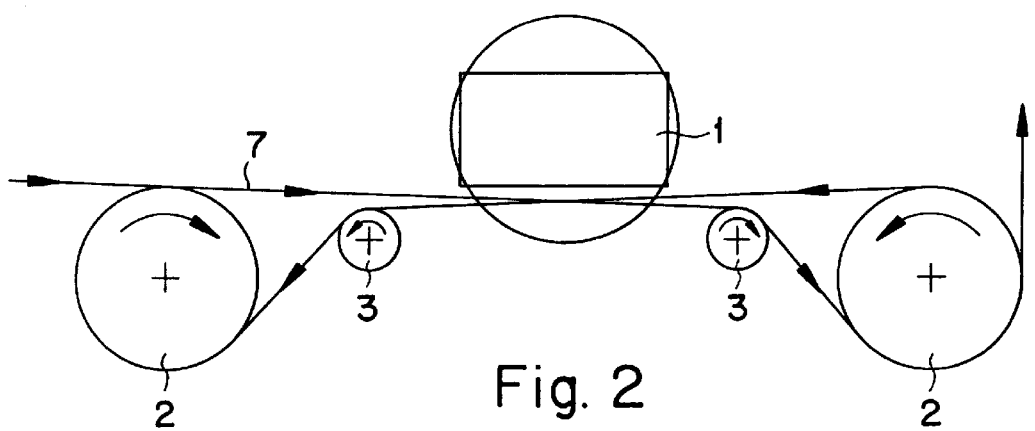
Figure 3:
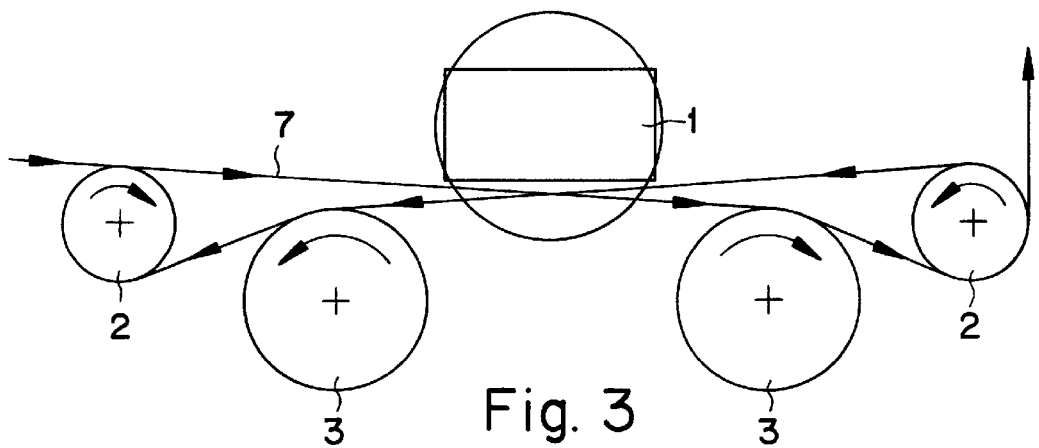
Figure 1A:
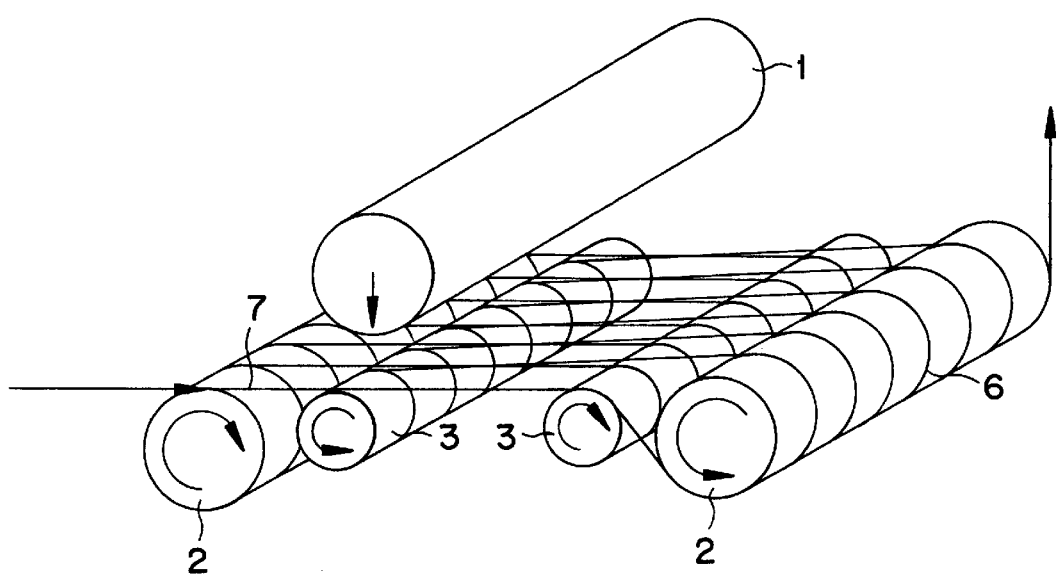
Figure 4:
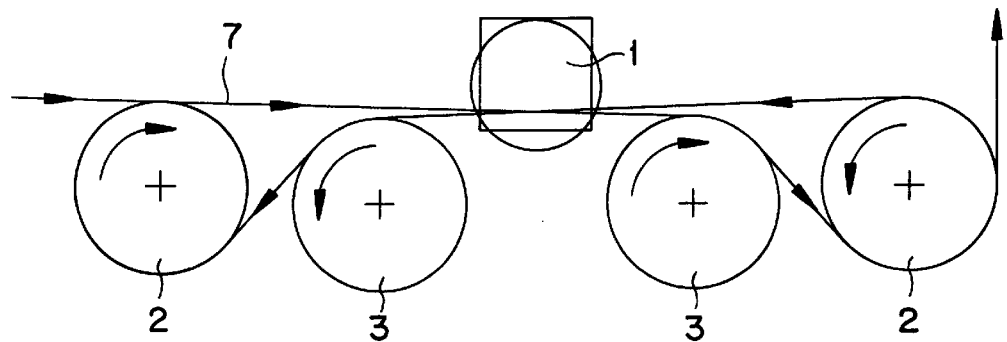
Figure 5:
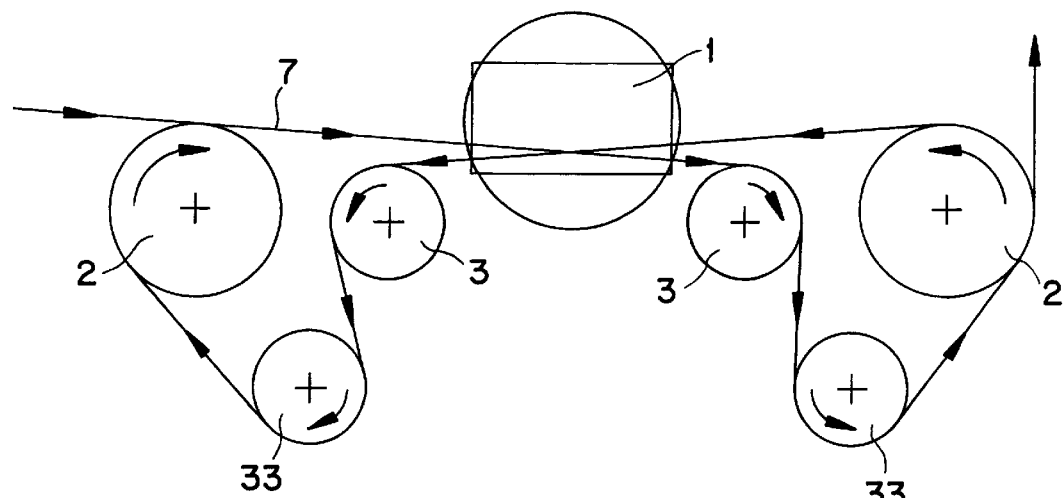
Figure 6:
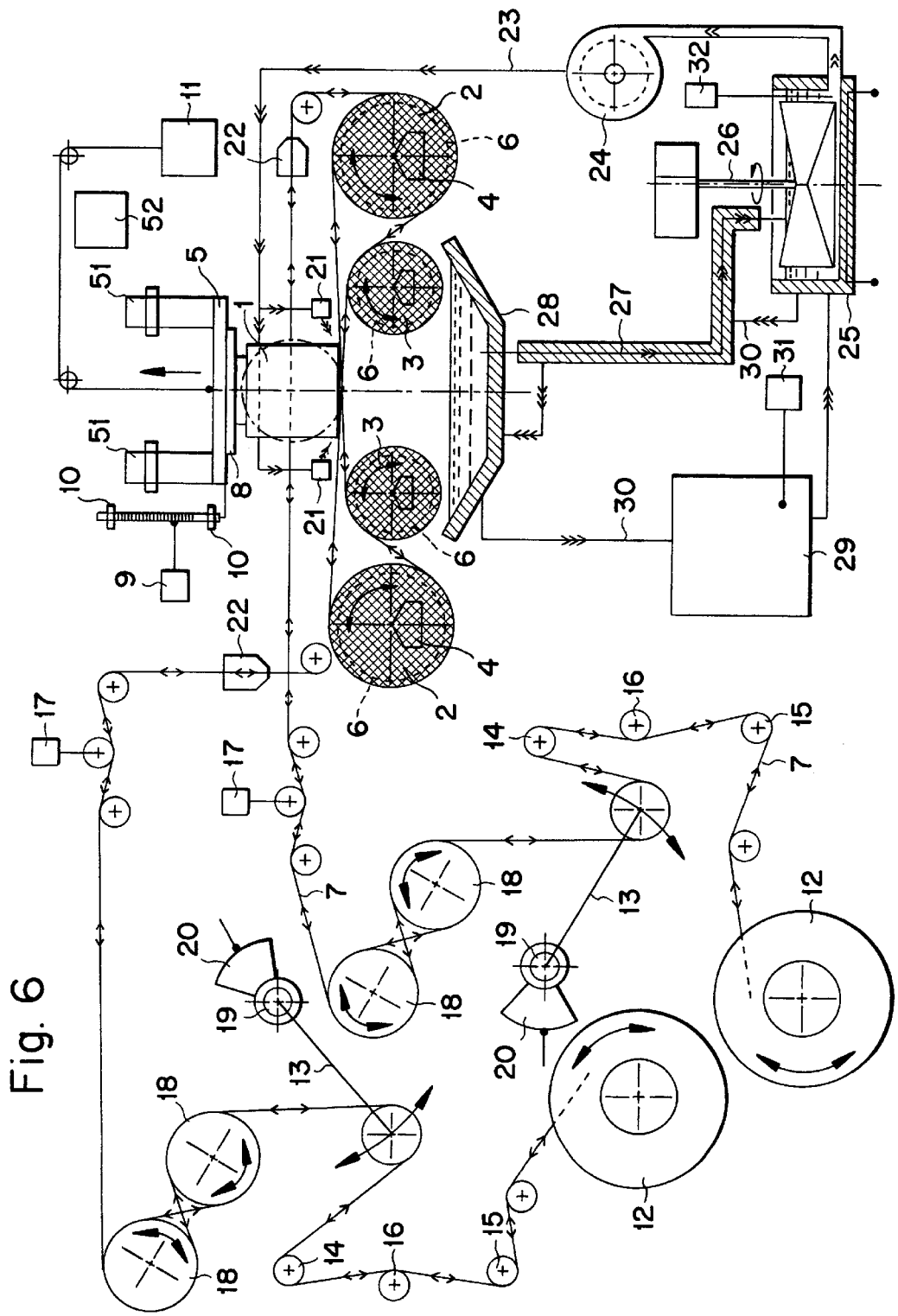

The cutting method and the construction of the wire saw which explain the invention are illustrated with the aid of the attached drawing. The figures show;

FIG. 1 an arrangement of a four-roller system comprising two deflection rollers and two smaller guide rollers with parallel axes in one plane, FIG. 1(a) is a perspective view of the arrangement of a four-roller system according FIG. 1, FIG. 2 the same roller system as in, FIG. 1, but arranged in such a way that the axes of the two pairs of rollers lie in different planes, FIG. 3 an alternative arrangement of the system with deflection rollers of smaller diameter and guide rollers of greater diameter, FIG. 4 an embodiment of the four-roller system with rollers of identical diameter mounted in one plane, FIG. 5 an alternative roller system in which additional rollers are attached, inserted between the deflection and guide rollers, and FIG. 6 the overall diagrammatic view of the basic functional elements of the wire saw.

EMBODIMENTS OF THE INVENTION, GIVEN BY WAY OF EXAMPLE

The saw for cutting blocks 1 of hard materials into plates consists of four basic main structural and technological areas, these being the roller system, the table with mountings, the wire storage container and the device for transporting the abrasive and stabilising its temperature. The roller unit forms the core of the saw and consists of at least one pair of deflection rollers 2 as well as one pair of guide rollers 3, which are attached to a fixed frame 4. The latter is securely connected to the support of the table 5 and ensures the necessary mechanical stability and rigidity of the roller system. The position of the guide rollers 3 in the fixed frame 4 is axially adjustable, the deflection rollers 2 being mounted in relation to the guide rollers 3 in such a way that the upper surface line of the former is higher than the upper surface line of these guide rollers 3. The surfaces of the rollers 2 and 3 are finely ground and provided with a system of peripheral grooves 6 for guiding the continuous, revolving, fixed carrier 7, preferably with a wire which forms a chain for pushing through the block 1 during cutting. One of the rollers 2, 3 of the roller system is configured as a driving roller and connected to a drive motor, not shown, with infinitely variable speed control, which makes it possible to set the movement speed of the continuous carrier 7 in a range of values between 0 and 15 m.s$^{-1}$ in both directions.

The table 5 of the saw is divided and serves to fix the orientation of the block 1 to be cut, e.g. consisting of semi-conductor crystals, and to orient the latter additionally in relation to the cutting plane. For the controlled insertion and pressing of the block 1 into the chain of the continuous, revolving solid carrier 7, wound round the roller system, the table 5 is provided with slide rods 51 and a drive system 52, e.g. a computer-controlled motor, the rate of feed of the table 5 being adjustable within the range between 0 and 1000 $\mu$m.s$^{-1}$, both upwards and downwards, in both directions. The block 1 to be cut is mechanically fastened to the table 5 via a system of glass or graphite sheets 8, and the cutting size of the block 1 or the information concerning its remaining thickness is monitored with the aid of an incremental linear probe 9. The end positions or the moving table 5 are here secured by means of limit switches 10, and in order to reduce the extreme load on tho individual main structural areas during its movement, the table 5 is provided with a balancing weight 11 which compensates for the mass of the mechanics of the table 5 and that of the block 1 to be cut.

A system for guiding the wire secures the actual process of securely winding the continuous solid carrier 7 on or off the reels 12 at a predetermined speed and a previously established, monitored tension, the winding-on and -off paths being separate from one another but strictly synchronised, The unevenness in coiling is compensated with the aid of tension lacks 13 and the actual transport of the solid carrier 7 is realised via a system of rollers 14, tension rollers 15 and retaining bars 16, the actual tension of the solid carrier 7 being measured with the aid of pressure sensors 17 and the tension being adjusted with the aid of differential voltage between the motors, not shown, driving the capstans 18 and the driving roller 2, 3 of the roller system. The coiling force as the solid carrier 7 is laid down is determined by the force of the springs 19 acting on the tension jacks 13 and any interference possibly arising is monitored by the signal generators 20 giving the end positions of the tension jacks 13 which are connected to the control system, not shown, of the wire saw. In a usual manner, the speed and the length of the uncoiled solid carrier 7 is likewise monitored with the aid of an incremental rotation sensing device, not illustrated, connected to one of the capstans. In the roller system, the solid carrier 7 is so coiled in the peripheral grooves 6 of the pairs or deflection rollers 2 and guide rollers 3, that it enters the system from the upper side of the first deflection roller 2 and is guided over the upper side of the opposite guide roller 3 to the lower side of the adjacent second deflection roller 2 which the carrier 7 encloses. Then the solid carrier 7 is guided from the upper side of this deflection roller 2 over the upper side of the opposite guide roller 3 back to the entry deflection roller 2 which it encloses. On the basis of the above multiple coiling of the solid carrier 7 in the peripheral grooves, a chain is formed in which the solid carrier 7 is guided in opposite directions between the guide rollers 3 into two respectively adjacent cuts in the block 1 to be cut, as emerges from FIGS. 1 to 5.

The abrasive solution used for the cutting is carried on to the continuous solid carrier 7 with the aid of distributors 21 which are directed towards the entry point of the solid carrier 7 into the cut in the block 1. Where the solid carrier 7 emerges from the roller system, high-performance air filters 22 are attached which remove the adhering residue of the abrasive from the solid carrier 7. The distributors 21 are connected with the aid of a system of supply pipes 23 via a pump 24 to the container provided with a stirring device 26. The container 25 is connected in turn via a waste pipeline 27 with the collecting vessel 28 disposed below the roller system and in which the abrasive solution is collected as it drains away. The temperature of the abrasive solution is kept within the predetermined range with the aid of a cooling circuit consisting of a cooling assembly 29 with a cooling pipe line 30 which is guided in the double casing walls of the container 25, the waste pipeline 27 and the collecting vessel 28. The actual temperature of the cooling fluid is monitored by a temperature sensor 31. The information about the flow and viscosity of the abrasive is monitored by a sensor/transmitter 32 accommodated in the container 25; all the values are passed on to the machine's control system, not shown, and evaluated there.

Before the wire saw begins its working process, the solid carrier 7 is coiled along its entire length, the characteristic numbers of the individual main functional regions of the machine are set, the block 1 spanned on to the table 5 with the aid of the sheets 8 and its position adjusted and fixed in relation to the cutting plane. Once the solid carrier 7 has been set in motion in the chosen direction of movement, the block 1 is pressed through the chain formed from the roller system of guide rollers 3 and deflection rollers 3 at the chosen rate of feed, the abrasive being added with the aid of the distributors at the point where the solid carrier 7 enters the cuts. Once the solid block 1 has been cut into individual segments, the table 5 is returned to its initial position and the whole process can be repeated, it being possible to choose afresh the movement direction of the solid carrier 7 and the other cut parameters, such as, for example, the rate of feed of the table 5 into the cut, the speed of movement and the tension of the solid carrier 7, the amount, temperature and viscosity of the abrasive etc.

The construction illustrated of the saw is not the only possible solution according to the invention. Keeping the basic arrangement of tho pairs of guide rollers 3 and deflection rollers 2 of the roller system, the manner of coiling and the movement of the solid carrier 7 between them and in the individual cuts in the solid block 1 the arrangement and the construction of the wire management, of the table 5 and its mountings as well as the individual elements of the device for transporting and cooling the abrasive, can be altered in any way at all without affecting the essence of the solution. As can be seen from FIGS. 1 to 4, the mutual size ratio and the reciprocal arrangement of the guide rollers 3 and of the deflection rollers 2 can be chosen, as long as the condition is met that the entry point for the solid carrier 7 into the cut of the block 1 must lie higher than the exit point. Thus, for example, according to FIG. 5, a pair of intermediate rollers 33 is inserted between the guide rollers 3 and the deflection rollers 2.

Commercial Application

The method of cutting blocks of hard material into plates and the saw for carrying out the method can be used in different branches of industry where hard materials, such as semi-conductors, ceramics or glass, for example, have to be cut into exact segments with opposite flat surfaces running parallel.

I claim:

1. A method of cutting blocks of hard materials into plates by the action of an abrasive, which abrasive is added in a loose state, comprising the steps of:

providing a wire saw apparatus including at least one pair of deflection rollers, at least one pair of guide rollers, and a continuous revolving fixed carrier disposed within peripheral grooves of the at least one pair of deflection and guide rollers so that the carrier forms a chain including first and second cutting portions through which the blocks of hard material are pressed, the at least one pair of guide rollers and deflection rollers rotate about parallel axes;

pressing the blocks of hard material into the first and second cutting portions of the carrier; and guiding the first and second cutting portions of the carrier in opposite directions by way of the at least one pair of deflection rollers and guide rollers which form two adjacent cuts in the block of hard material.

2. The method according to claim 1, wherein the carrier in the chain of the roller system is guided repeatedly in peripheral grooves from the upper side of the first deflection roller over the upper side of the guide roller lying opposite on to the lower side of the adjacent second deflection roller, after passing which it is guided over the upper side of the guide roller lying opposite again to the lower side of the first deflection roller and then back to its upper side.

3. A saw for cutting blocks according to the method of claim 1, the saw comprising:

a roller system which has rollers provided with peripheral grooves and which is attached to a frame, and includes a table with mountings, a wire arrangement and a device for transporting and heat-stabilizing the abrasive, wherein:

the roller system is formed from at least one pair of guide rollers and one pair of deflection rollers, the deflection rollers being so mounted in relation to the guide rollers that the deflection roller and guide roller mounted beside one another rotate in opposite directions, the direction of rotation between the two guide rollers and the two deflection rollers being likewise opposed.

4. The saw according to claim 3, wherein:

the deflection rollers and the guide rollers are so positioned that the upper surface line of the deflection rollers is disposed higher than the upper surface line of the guide rollers.

5. The saw according to claim 3, wherein:

the position of the guide rollers in the frame is axially adjustable.

6. The saw according to claim 3, wherein:

the solid carrier is wound several times around the deflection rollers and the guide rollers of the roller system, in such a way that it forms a chain in which it is guided into the working space between the pair of guide rollers in opposite directions in respectively two adjacent peripheral grooves from the top sloping downwards or from the bottom sloping upwards.

* * * * *